July 25, 1944.  H. T. LAMBERT  2,354,385
BRAKE
Filed April 15, 1943  4 Sheets-Sheet 1

INVENTOR.
H. T. Lambert
BY Robb & Robb
ATTORNEYS.

July 25, 1944.    H. T. LAMBERT    2,354,385
BRAKE
Filed April 15, 1943    4 Sheets-Sheet 2

INVENTOR.
H. T. Lambert
BY Robbert Cobb
ATTORNEYS.

July 25, 1944. H. T. LAMBERT 2,354,385
BRAKE
Filed April 15, 1943 4 Sheets-Sheet 3
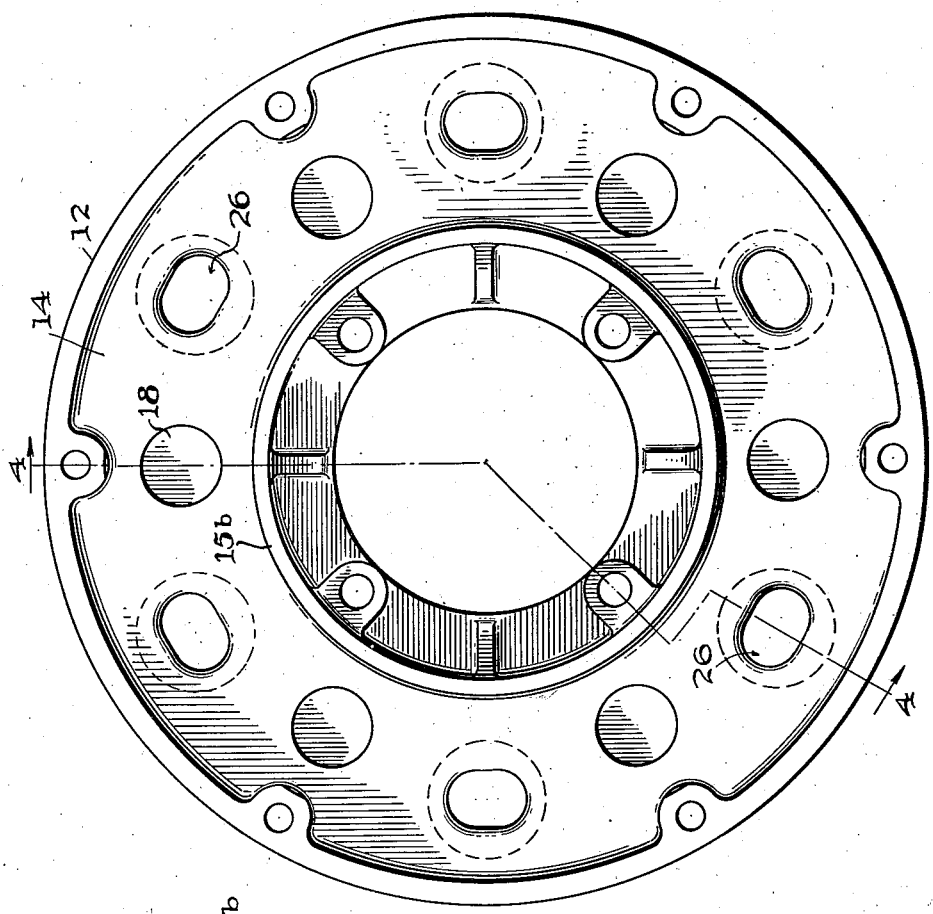
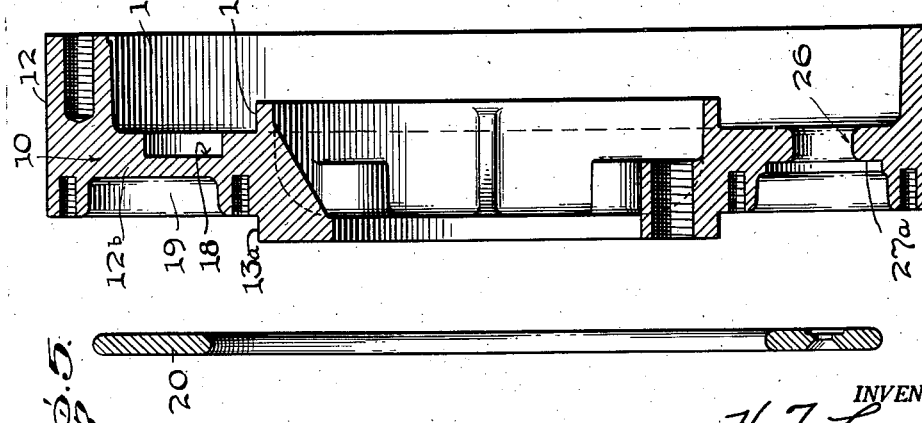
INVENTOR.
H. T. Lambert
BY
Robb & Robb
ATTORNEYS.

July 25, 1944.   H. T. LAMBERT   2,354,385
BRAKE
Filed April 15, 1943    4 Sheets-Sheet 4
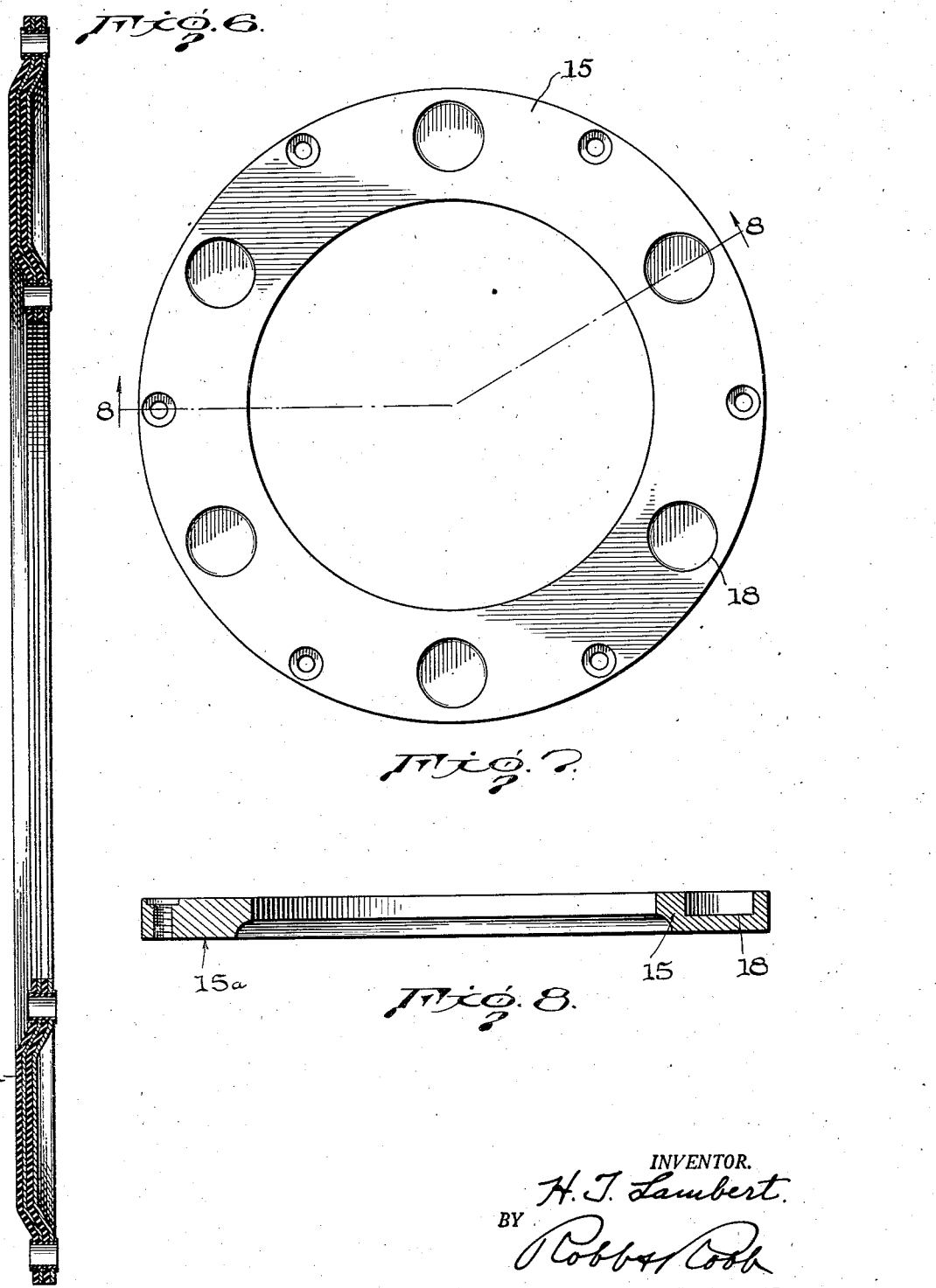
INVENTOR.
H. T. Lambert.
BY
Robbs Cook
ATTORNEYS.

Patented July 25, 1944

2,354,385

UNITED STATES PATENT OFFICE 2,354,385

BRAKE

Homer T. Lambert, St. Joseph, Mich., assignor to Lambert Brake Corporation, St. Joseph, Mich., a corporation of Michigan Application April 15, 1943, Serial No. 483,191

10 Claims. (Cl. 188—72)

The present invention relates to improvements in brake constructions particularly designed for heavy duty and high speed operation of automobiles, buses, trucks, tanks and airplanes.

It is quite well known that at the present time practically all brakes used upon heavy trucks and buses are air operated and of the drum type, embodying separate shoes, dividing cams, with attached levers, air operated members, rods, bearings and diaphragms, all of which are more or less exposed to road hazards, mud, rain, snow and such surface conditions, resulting in rust, clogging and very inefficient operation, if not complete failure, in a short period of time. Non-uniformity of brake action and ineffective power in these constructions is not only due to these conditions, but also to the drum type of construction where equalization of application of the pressure forces throughout the braking surfaces is rarely, if ever, attainable.

Having in view these problems, it has been the primary object of my invention herein disclosed to utilize a disc form of brake to obtain the maximum braking area and to so construct and arrange the associated brake applying means, with or without servo-mechanism, that the elements thereof may be completely enclosed and less subject to damage from road conditions and more capable of maintenance of high efficiency and maximum braking power.

More particularly, an object of this invention is to increase the pressure area of the diaphragm over that of the braking area, thereby creating an excess of power to provide a more powerful braking operation with the exercise of less effort on the part of the operator.

Another object is to provide a diaphragm operated type of brake which may be actuated either by means of compressed air or other pressure mediums, such as by hydraulic or steam pressure fluids, and which are received in a sealed chamber at one side of the diaphragm, located preferably relatively remotely from the friction discs, to thereby prevent injury to the diaphragm from the heat produced by the friction on the braking surfaces created incident to the use of the large area of these surfaces by the powerful braking forces.

Furthermore, I believe I am the first to provide a large area diaphragm in conjunction with braking surfaces of corresponding form where the ultimate pressure is expressed uniformly over the entire braking surfaces, thereby creating equalization of pressure at all points during the pressure application.

Other objects and advantages of my invention will be hereinafter described, and the novel features thereof defined by the appended claims.

In the drawings:

Figure 3 is a side elevation of the body portion of the brake casing;

Figure 4 is a sectional view taken about on the plane indicated by the line 4—4 of Figure 3, looking in the direction of the arrows;

Figure 5 is a sectional view through the actuating ring for operating the brake discs;

Figure 6 is a sectional view through the laminated flexible diaphragm;

Figure 7 is a view in elevation of the primary friction disc; and

Figure 8 is a sectional view taken on the line 8—8 of Figure 7, looking in the direction of the arrows.

Like reference characters designate corresponding parts in the several figures of the drawings.

In carrying out the invention, I provide a construction, preferably including a servo-mechanism, similar in general respects to that shown in my prior Patent No. 2,099,489, dated November 16, 1937, and this construction will first be therefore described as a part of the general combination of this powerful brake construction.

The construction herein disclosed is primarily devised for vehicles and so disclosed herein, though it may just as readily be embodied in other constructions where powerful braking action is requisite.

Figure 1:
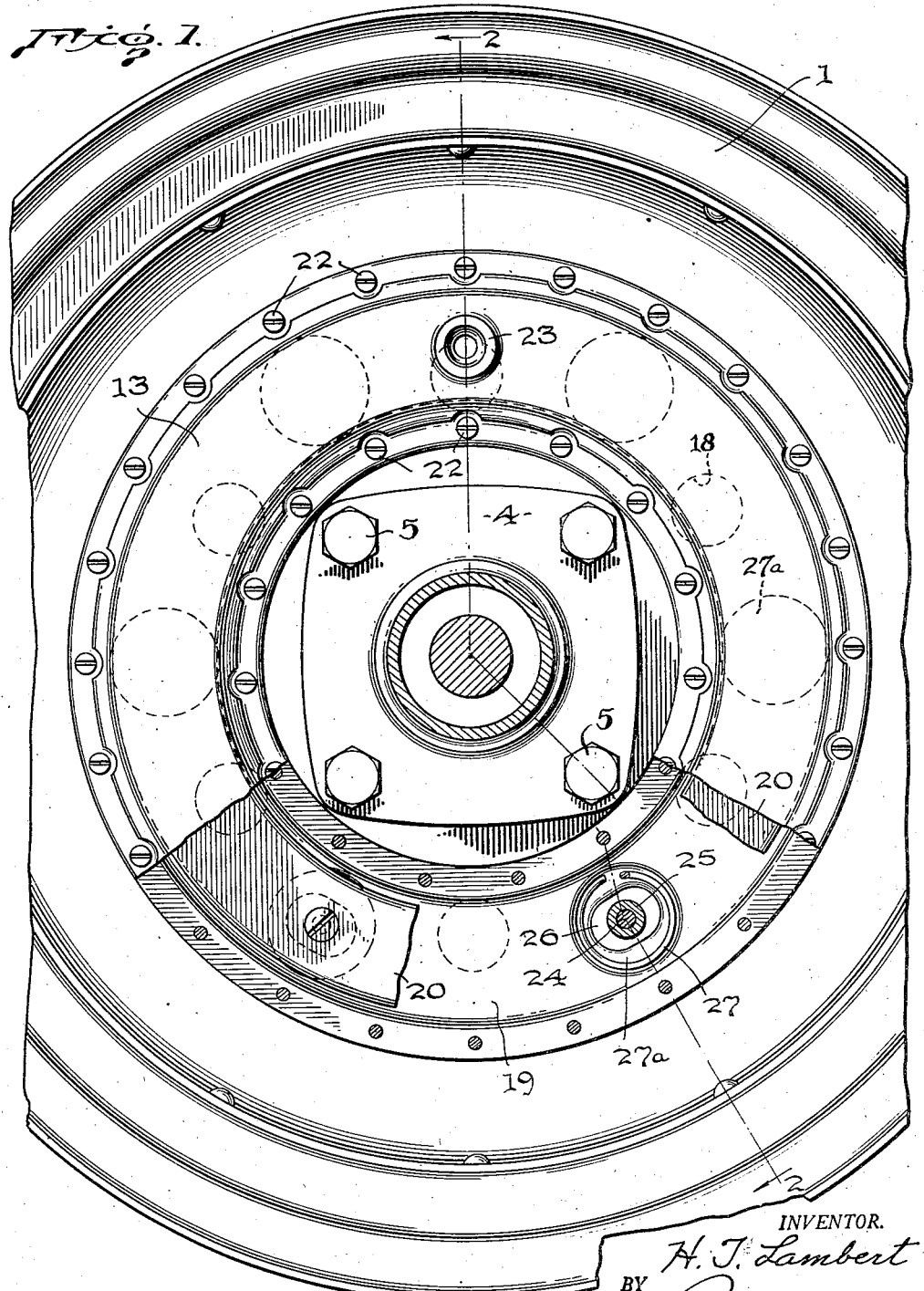
Figure 1 is a side elevation of my brake construction shown in its application to a vehicle wheel, parts thereof being broken away and shown in section to more clearly disclose certain details of the construction.
Figure 2:
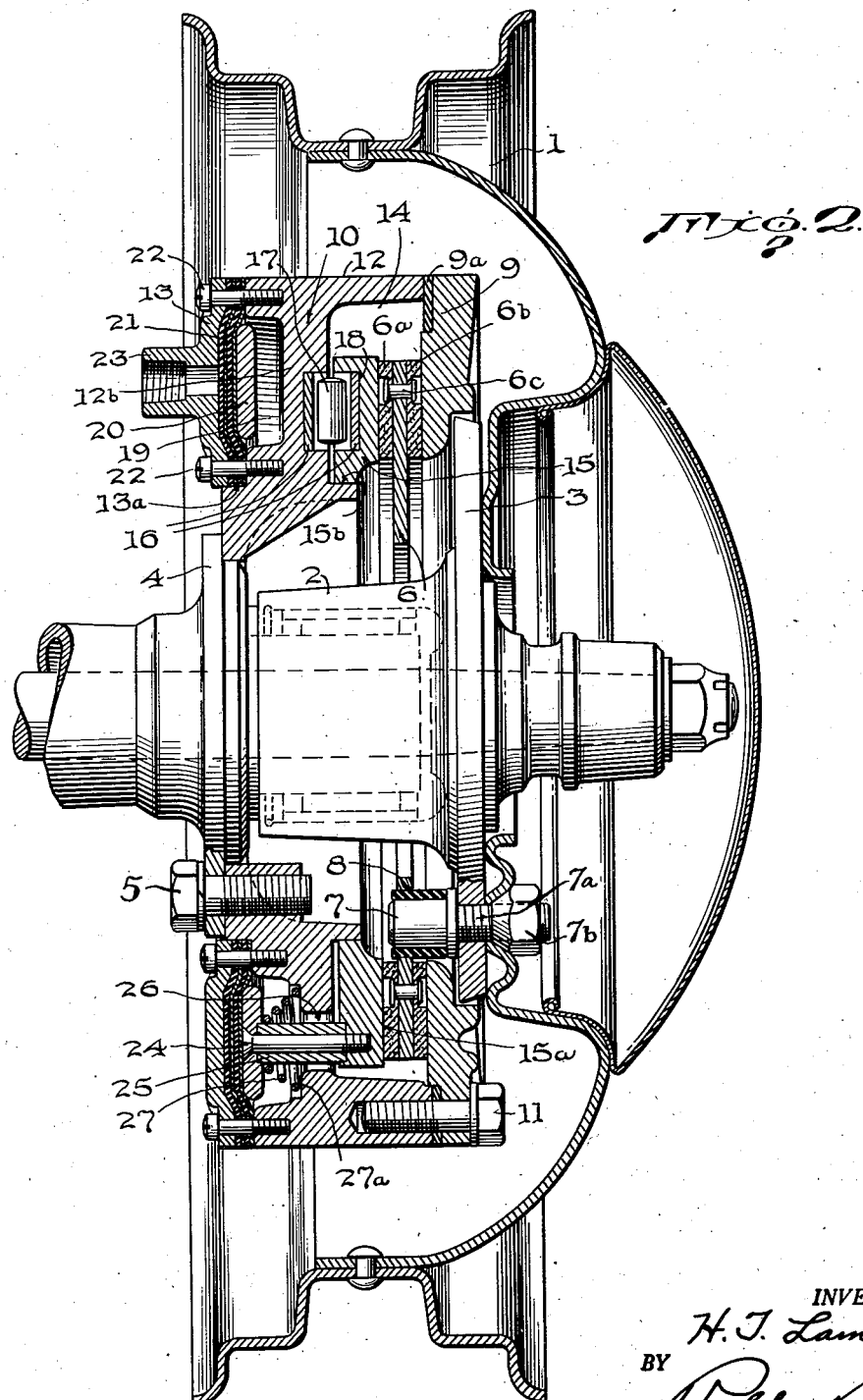
Figure 2 is a transverse sectional view taken about on the plane indicated by the line 2—2 of Figure 1.

Referring more particularly to Figure 2 and specifically describing the invention, the wheel 1 is provided with a hub 2, and mounting plate 3, between which and the axle housing flange 4, the braking unit of this invention is secured by the bolts 5. The rotating member 6 to be braked, otherwise called the braking ring, is mounted upon a series of studs 7, each having a rubber sleeve or bushing 8 thereon to prevent noise. The studs 7 are formed as extensions of bolts 7a on which the wheel 1 is secured to the hub flange 3 by nuts 7b. This ring, therefore, revolves with the wheel and has applied to its opposite faces the friction linings 6a, 6b, secured in position by rivets 6c.

At one side of the braking ring is located the stationary secondary friction disc or backing plate 9, which forms the outer closure of the brake unit and has attached to it the intermediate member 10, as by means of the stud bolts 11. This member 10 performs a number of important functions, acting primarily as the body part of the brake unit casing. Its peripheral flange 12 abuts at one side against the gasketed seat 9a of the friction disc 9, while at its inner end it receives the cover plate or ring 13, thus providing a closed casing for the operative parts of this brake unit.

The body member 10 is webbed interiorly to form a chamber 14 at one side or end of the casing in which the rotating brake ring 6 is arranged, together with the primary friction disc 15, the latter having a braking surface 15a engageable by the adjacent friction lining 6a of said ring. The body member 10 is formed with an annular seat 15b to slidingly and rotatably receive the inner annular face of the primary disc 15.

This primary disc 15, as in my prior patent, is axially movable and slightly rotatable on the seat 15b, as stated, in functioning to provide servo-action, as hereinafter more specifically described incident to the pick up of rotary motion upon initial contact of the disc with the rotating brake ring 6. Between the web 12b and the adjacent face of the primary disc are arranged spaced energizing means, inclusive of pairs of camming discs 16, and roller members 17, said discs being mounted in suitable circular recesses 18 corresponding to the similar arrangement in my prior patent hereinbefore mentioned.

Taking up now the important features of improvements in this brake unit, they include the recess or chamber 19 at the opposite side of the web 12b from the chamber 14, the pressure actuating ring 20 operable therein, and the diaphragm 21 between the said ring and closure plate or cover 13.

It will be observed that this diaphragm is of considerably larger area than the braking surfaces before described, and at the same time is completely isolated therefrom by the intermediate webs. It fits snugly on the annular shoulder 13a and is tightly clamped in position against the annular casing flange 12 by the bolts 22 arranged to pass through the diaphragm at close intervals around its inner and outer periphery, thus effectively closing the chamber or recess 19.

The pressure fluid is admitted into this chamber at one side of the diaphragm through the inlet boss 23 to which a conduit from the source of supply of compressed air or other pressure fluid is connected.

It will be observed now that the pressure ring 20 is connected to the primary disc 15 by means of the screws 24 and held in spaced relation thereto by the spacing sleeves 25, said screws and sleeves extending through relatively large openings 26 in the web 12b so as to permit of slight rotation of the ring 20 with the disc 15 in servo-action.

Surrounding the sleeves 25 are conical or tapered expansion springs 27, each seated at one end in a recess 27a in the web 12b, and at the other end against the ring 20, so as to normally press the ring against the flexible diaphragm conforming more or less to the cover concavity, so that as shown this diaphragm may flex inwardly and outwardly without tearing around its bolt holes.

It may be noted that this diaphragm may be made up of a layer formed of asbestos fibre and friction material, then a layer of rubber, a third layer of fibre, and finally a fourth layer of rubber, etc., all moulded to make up a thickness of about $\tfrac{3}{16}''$ and pressed into the offset formation best seen in Figure 6. It is to be understood that I do not wish to be confined to this particular make-up of material, since any suitable flexible and pliable material having the strength and form sufficient to stand the fluid pressures encountered may be used.

While the operation of this brake will be clear from the foregoing description, such operation will now be briefly set forth by way of summary. When brake operation is desired, the pressure fluid, such as air under pressure, is admitted through the inlet 23 against the face of the diaphragm, displacing the latter inwardly of the chamber 19 (to the right as seen in Figure 2). In this connection, it is to be observed that the diaphragm 21 has the outer portion of its surface disposed much beyond the outer periphery of the braking ring 6 and the braking surfaces therefor. The pressure fluid immediately fills the complete space at the inlet side of the diaphragm and therefore produces an equalization of the pressure force entirely around and upon the ring 20, which in turn through the screws 24 and sleeves 25 shifts the primary disc 15 against the rotating braking ring 6.

Upon initial contact between these parts, the disc 15 picks up slight rotary movement, causing the energizing rollers 17 to climb up the beveled or camming faces of the discs 16. This torque action sets up automatically a powerful mechanical pressure upon the rotating braking ring 6, backed by the secondary disc 9, effectively retarding movement of the ring and the wheel. Because of the effective area of the diaphragm, due to its size and arrangement as before explained, in relation to the braking surfaces of the discs, the braking action is uniformly and instantly controlled by great power to the degree desired for a retarding or stopping action.

As the fluid pressure is discontinued, the powerful springs 27 expand and move the ring 20 and diaphragm to the left, thereby disposing all parts in their inactive, normal positions. The diaphragm on the one hand and the gasketed seat 9a on the other effectively prevent the entrance of water or foreign matter into the brake casing, and the heat due to friction of the braking surfaces is quickly dissipated from the chamber 14 through the surrounding wall to atmosphere.

While the specific details have been herein shown and described, the invention is not confined thereto as changes and alterations may be made without departing from the spirit thereof as defined by the appended claims.

I claim:

1. In brake mechanism of the class described, a stationary casing, having means dividing the casing into spaced chambers and closing means for each of said chambers, an axially movable rotary member to be braked and braking means therefor arranged in one of said chambers, pressure operated actuating means for said braking means including a diaphragm and thrust transmitting means mounted in the other of said chambers, said diaphragm being secured to the casing by the closure means for the last-mentioned chamber, thereby isolating said actuating means from the heat produced by brake application, and expansion means intermediate the diaphragm and the dividing means for moving the diaphragm to relief position upon release of the actuating pressure.

2. Brake mechanism as set forth in claim 1, wherein the pressure operated actuating means is provided with an effective pressure surface of greater area than the effective braking surfaces of the said braking means.

3. Brake mechanism as set forth in claim 1, wherein the pressure operated actuating means includes a spring pressed annular normally holding the diaphragm collapsed, and said thrust transmitting means extending through the dividing means for transferring the movements of the diaphragm to the braking means.

4. In brake mechanism of the class described, a casing, a partition in said casing, a rotary disc therein to be braked at one side of the partition, a friction disc cooperative with the rotary disc to apply brake pressure to the latter, a backing plate against which the rotary disc is pressed, said plate constituting a closure for one end of said casing and sealing therein the rotary and friction discs, a pressure-operated flexible diaphragm arranged in said casing at the other side of said partition and spaced from said discs, and actuating means associated with said diaphragm for transmitting through said partition movements of the diaphragm to the friction disc in brake applications, said actuating means comprising a slightly rotatable ring cooperative with the diaphragm at one side and operating connections between said ring and the said friction disc.

5. A brake unit assembly comprising a casing having a cover plate for one end of said casing, a partition in said casing dividing the same into separate chambers, brake friction means in one of said chambers in operative association with said cover plate, a cover member for the other of said chambers, a flexible diaphragm in the second-mentioned chamber, means for connecting the cover member and diaphragm at their peripheral edges to the partition so as to provide a sealed inlet space for pressure fluid at one side of the diaphragm when said pressure fluid is admitted thereto, and an actuating ring in the second chamber coacting with the diaphragm and operatively connected to the brake friction means in the first chamber for transmitting pressure to the friction means upon brake application, said brake friction means comprising a rotary member to be braked, a friction disc at one side of the rotary member for pressing the latter against the cover plate in brake application and servo-energizing means coacting with the friction disc for multiplying the braking forces applied by said disc to the rotary member.

6. A brake unit assembly for vehicle wheels comprising a stationary casing, a partition for dividing said casing into two chambers, a rotary disc member to be braked and a cooperating friction disc arranged in one of said chambers, a flexible diaphragm arranged in the other of said chambers, a cover member associated with said diaphragm and having a fluid pressure inlet therethrough, fastening means passing through said cover member and the outer and inner peripheral edges of the diaphragm for connecting the cover and diaphragm to the casing at said peripheral edges, an actuating ring coacting with one side of the diaphragm and connected to the friction disc for transmitting movement of the diaphragm thereto, and means for normally holding the friction disc out of contact with the rotary member to be braked.

7. A brake unit assembly comprising a stationary casing, a partition for dividing said casing into two chambers, a rotary member to be braked and a cooperating friction disc arranged in one of said chambers, a flexible diaphragm arranged in the other of said chambers, a cover member associated with said diaphragm and having a fluid pressure inlet therethrough, fastening means passing through said cover member and the edges of the diaphragm for connecting the cover and diaphragm to the casing, an actuating ring coacting with one side of the diaphragm and connected to the friction disc for transmitting movement of the diaphragm thereto, and means for normally holding the friction disc out of contact with the rotary member to be braked, said friction disc being slightly rotatable with the rotary member, and combined with servo-energizing means operable by said disc to multiply the pressure force applied through the actuating ring.

8. A brake unit assembly of the class described, comprising a casing, a partition in said casing dividing the same into two spaced chambers, a rotary member to be braked mounted in one of said chambers, a friction disc associated with the rotary member to be braked, a diaphragm mounted in the other of said chambers and secured at its edges to the casing, an inlet for admitting pressure fluid into said last-mentioned chamber at one side of the diaphragm, an actuating ring in said last-mentioned chamber coacting with the diaphragm at its other side from the inlet, the partition in said casing being provided with openings therethrough, connecting means extending through said openings for connecting the actuating ring to the friction disc, and spring means in the second-mentioned chamber seating against the partition at one end and against the actuating ring at the other end for normally holding said ring in cooperative relation to the diaphragm and the friction disc out of contact with the rotary member to be braked.

9. In combination with a wheel hub and axle housing having spaced flanges thereon, of a brake unit assembly disposed between the said flanges and comprising a casing through which the hub and axle assembly extends, the flanges aforesaid closing the casing with respect to its ends to seal said casing against admission of water or other foreign matter, said casing being provided with a cover plate at one end constituting a braking surface, a rotary member to be braked cooperating with the braking surface, a friction disc mounted at one side of the rotary member opposite to said braking surface for application of brake pressure to the rotary member, a diaphragm in said casing, said casing having an inlet for admitting pressure fluid into the casing at one side of said diaphragm, rotary means coacting with said diaphragm and connected to the friction disc to rotate therewith for transmitting movements of the diaphragm to the friction disc, means in said casing cooperative with the movement transmitting means for normally holding the friction disc out of contact with the rotary member to be braked, and means for connecting said casing to one of said flanges and the rotary member to be braked to the other of said flanges.

10. In brake mechanism for vehicle wheels of the class described, a stationary body member having an internal web forming a diaphragm chamber at one side thereof, an annular diaphragm mounted in said chamber and secured to the body member so as to provide an enclosed chamber at each side of the diaphragm, a closure plate for said diaphragm chamber between which and the body member the diaphragm is fixedly secured, an axially movable rotary disc member to be braked mounted at the other side of the web, a backing plate at one side of the rotary member, and spring pressed means intermediate the diaphragm and the rotary member for transmitting movement of the diaphragm to the rotary member to effect frictional contact of the latter with said plate in braking operation and return of the diaphragm to relief position, said means including an annular member coacting with the diaphragm and a spring directly on said annular member.

HOMER T. LAMBERT.